United States Patent [19]

Ohya

[11] Patent Number: 5,385,989
[45] Date of Patent: Jan. 31, 1995

[54] THERMAL RESISTANCE RESIN DUST FOR FRICTION MATERIAL

[75] Inventor: Kazuyuki Ohya, Tokyo, Japan

[73] Assignee: Mitsubishi Gas Chemical Company, Inc., Tokyo, Japan

[21] Appl. No.: 274,378

[22] Filed: Jul. 13, 1994

Related U.S. Application Data

[63] Continuation of Ser. No. 25,052, Mar. 2, 1993, abandoned, which is a continuation-in-part of Ser. No. 868,359, Apr. 14, 1992, abandoned.

[30] Foreign Application Priority Data

Apr. 15, 1991 [JP] Japan ................ 3-109902

[51] Int. Cl.$^6$ ............................................. C08F 283/00
[52] U.S. Cl. .................................... 525/502; 525/423; 525/438; 525/507; 525/529; 525/530; 525/533; 528/87; 528/104
[58] Field of Search ............... 525/423, 438, 502, 507, 525/529, 530, 533; 528/87, 104

[56] References Cited

U.S. PATENT DOCUMENTS

| | | | |
|---|---|---|---|
| 3,562,214 | 2/1971 | Kubens et al. | 528/104 |
| 4,110,364 | 8/1978 | Gake et al. | 525/422 |
| 4,393,195 | 7/1983 | Gaku et al. | 525/187 |
| 4,396,745 | 8/1983 | Ikeguchi | 525/332.9 |
| 4,496,695 | 1/1985 | Sugio et al. | 525/391 |
| 4,717,609 | 1/1988 | Gaku et al. | 525/438 |
| 4,740,343 | 4/1988 | Gaku et al. | 523/457 |
| 4,774,282 | 9/1988 | Qureshi | 525/467 |
| 4,780,507 | 10/1988 | Gaku et al. | 525/65 |
| 4,904,760 | 2/1990 | Gaku et al. | 525/327.6 |
| 4,944,373 | 7/1990 | Ohya et al. | 560/301 |
| 5,132,778 | 7/1992 | Juskey et al. | 523/139 |

FOREIGN PATENT DOCUMENTS

| | | |
|---|---|---|
| 0324908 | 7/1989 | European Pat. Off. . |
| 0344778 | 12/1989 | European Pat. Off. . |
| 56-10529 | 2/1981 | Japan . |
| 59-8718 | 1/1984 | Japan . |
| 61-166853 | 7/1986 | Japan . |
| 02242865 | 9/1990 | Japan . |

OTHER PUBLICATIONS

World Patents Index Latest Derwent Publications Ltd., London, GB; AN 87-344225 & JP-A-62 246 922 (Sumitomo Bakelite KK) 18 Feb. 1985 *abstract*.
World Patents Index Latest Derwent Publications Ltd., London, GB; AN 85-078377 & JP-A-60 031 585 (Dainippon Ink Chem KK) 18 Feb. 1985 *abstract*.

*Primary Examiner*—Melvyn I. Marquis
*Assistant Examiner*—Randy Gulakowski
*Attorney, Agent, or Firm*—Browdy & Neimark

[57] ABSTRACT

A thermal resistance resin dust obtained by a process which comprises
  a step of preparing a composition comprising
    (I) an aromatic hydrocarbon-formaldehyde resin-modified novolak type epoxy resin and
    (II) a cyanate ester resin composition comprising
      (a) polyfunctional cyanate esters, prepolymers of said cyanate ester, or prepolymers of said cyanate ester and an amine; or (a) in combination with (b) a monofunctional or polyfunctional maleimide, a prepolymer of said maleimide or a prepolymer of said maleimide and an amine, and
    optionally (III) an inorganic filler with cleavage property,
  a step of curing the composition at a final curing temperature of not less than 200° C. and
  a step of grinding the cured product, is disclosed.

16 Claims, No Drawings

THERMAL RESISTANCE RESIN DUST FOR FRICTION MATERIAL

This application is a continuation of co-pending application Ser. No. 08/025,052, filed Mar. 2, 1993, now abandoned, itself a continuation-in-part of parent co-pending application Ser. No. 07/868,359, filed Apr. 14, 1992, now abandoned.

This application is continuation in part application of U.S. Ser. No. 868,359, filed on Apr. 14, 1992.

FIELD OF THE INVENTION

The present invention relates to an improved thermal resistance resin dust for friction material.

More particularly, the present invention relates to a thermal resistance resin dust obtained by a process which comprises preparing a composition comprising (I) an aromatic hydrocarbon-formaldehyde resin-modified novolak type epoxy resin and (II) a cyanate ester resin composition, curing the resulting composition at a final curing temperature of not less than 200° C. and grinding the cured product. The cured product has a 10% weight loss on heating of not less than 320° C., which is used in this technical field as a thermal resistance factor, and is thermally decomposed without undergoing liquefaction, and a carbonization ratio of the decomposed substance is also high. The friction coefficient at 4000° C. of the friction material obtained by using the resin dust is kept as high as the friction coefficient at 100° C. of the friction material. In addition, the friction coefficient of the friction material in the range of room temperature is high. As a result, when the resin dust of the present invention is used as a disc brake pad, and harsh sound is sufficiently reduced and the high friction coefficient and excellent anti-fade performance can be maintained in braking at high speeds. in addition, the resin dust of the present invention has excellent wearing properties.

BACKGROUND OF THE INVENTION

In the prior art, formalin resin obtained by using cashew nutshell oil, drying oil, etc. or a rubber, such as a natural rubber or SBR have been used as relatively less expensive organic friction dusts for friction material. However, these prior friction dusts have poor thermal resistance, and mechanical strength upon heating, and The upper limit of use temperature thereof is low.

For example, a rubber-based dust obtained by thermal-treating carbon-containing rubber, such as used tire, followed by grinding the thus-treated rubber has a temperature, at which weight loss or heating starts, of as 150°–200° C. as, and 10% weight loss on heating, which is used as a thermal resistance factor, is as low as 200°–230° C. In addition, when the rubber is in the state of a high temperature the rubber becomes pitchy. Therefore, the friction coefficient of the rubber is lowered greatly.

Cashew resin dust which is used in the greatest amount undergoes 10% weight loss on heating in air of 260°–300° C., and is thermally decomposed at a temperature of 520°–550° C.; residual carbon of cashew resin dust upon thermal decomposition is very low. The cashew resin dust is decomposed via pitch at a temperature of about 280° C. similar to rubber-based dust. Therefore, the friction coefficient thereof is lowered greatly. The dust also has great shortcomings from the viewpoint of safety. In addition, since a strongly acidic compound is used as a catalyst for preparing the cashew dust, a metallic filler is likely to be corroded by the remaining acidic compound.

Conventional friction materials which use asbestos as a reinforcement substrate and a phenol resin as a binder resin are increasingly supplanted by non-asbestos types as exemplified by semi-metallic friction materials using steel fibers as a reinforcement substrate and a friction material that uses aramid fibers or a carbon filler as a chief component of the reinforcement substrate. However, it is known that disk brake pads using those substitute reinforcement substrates have proved to generate harsh sound generally called "a squeal of brakes" when braking is applied.

SUMMARY OF THE INVENTION

An object of the present invention is to provide a resin dust which can be used as a material for the production of a friction member such as a disk brake pad that imparts a consistent friction coefficient over the range of from ambient temperature to high temperatures of at least 400° C., that will decompose without undergoing liquefaction which can be a cause of fade, and that is capable of effectively damping the squeal of brakes which would otherwise occur when braking is applied.

The present invention relates to a thermal resistance resin dust obtained by a process which comprises
a step of preparing a composition comprising
  (I) an aromatic hydrocarbon-formaldehyde resin-modified novolak type epoxy resin and
  (II) a cyanate ester resin composition comprising (a) polyfunctional cyanate esters, prepolymers of said cyanate ester, or prepolymers of said cyanate ester and an amine; or (a) in combination with (b) a monofunctional or polyfunctional maleimide, a prepolymer of said maleimide or a prepolymer of said maleimide and an amine, the amount of Component (II) being used in an amount of less than 50% by weight on the basis of combined weight of Components (I) and (II),
a step of curing the composition at a final curing temperature of not less than 200° C. and
a step of grinding the cured product.

The present invention also relates to a thermal resistance resin dust obtained by a process which comprises
a step of preparing a composition comprising
  (I) an aromatic hydrocarbon-formaldehyde resin-modified novolak type epoxy resin,
  (II) a cyanate ester resin composition comprising (a) polyfunctional cyanate esters, prepolymers of said cyanate ester, or prepolymers of said cyanate ester and an amine; or (a) in combination with (b) a monofunctional or polyfunctional maleimide, a prepolymer of said maleimide or a prepolymer of said maleimide and an amine and
  (III) an inorganic filler with cleavage property, the amount of Component (II) being used in an amount of less than 50% by weight on the basis of combined weight of Components (I) and (II), Component (III) being used in an amount of 5–60 parts by weight per 100 parts by weight of the combined amount of Components (I) and (II),
a step of curing the composition at a final curing temperature of not less than 200° C. and
a step of grinding the cured product.

The preferable embodiments of the present invention are as follows:

(1) The aromatic hydrocarbon-formaldehyde resin-modified novolak type epoxy resin (I) is obtained by reacting an aromatic hydrocarbon-formaldehyde resin, a phenol and a formaldehyde to form an aromatic hydrocarbon resin-modified novolak, followed by reacting the OH group of the resulting novolak with epichlorohydrin to epoxidize the novolak.

(2) The aromatic hydrocarbon-formaldehyde resin has a number average molecular weight of 350–1000, an oxygen content of 5–204 and a melting point of 40°–120° C.

(3) The aromatic hydrocarbon-formaldehyde resin has a number average molecular weight of 350–1000, an oxygen content of 5–20% and a melting point of 40°–120° C.

(4) The amount of said cyanate ester resin compound employed is in the range of 10–40% by weight.

(5) The aromatic hydrocarbon-formaldehyde resin-modified novolak is prepared by using an aromatic hydrocarbon-formaldehyde resin/phenol having a ratio by weight of 100:100 to 100:200.

DETAILED DESCRIPTION OF THE INVENTION

The aromatic hydrocarbon-formaldehyde resin-modified novolak type epoxy resin (hereinunder referred to as Component (I)) is obtained by reacting an aromatic hydrocarbon-formaldehyde resin, a phenol and a formaldehyde to form an aromatic hydrocarbon resin-modified novolak, followed by reacting the OH group of the resulting novolak with epichlorohydrin to epoxidize the novolak.

Usually, the epoxy resins are epoxy resins derived from bisphenol A, phenol novolak or cresol novolak. However, when a bisphenol A type epoxy resin is used instead of the hydrocarbon-formaldehyde resin-modified novolak epoxy resin, the resulting resin dust has poor thermal resistance and becomes sticky at a high temperatures. Therefore, the friction coefficient of the dust becomes unstable, and the wearing amount of the dust becomes much. Therefore, the resin cannot be used.

When novolak type epoxy resin derived from phenol or cresol is used instead of Component (I), the resulting resin dust is rigid and brittle.

The aromatic hydrocarbon-formaldehyde resin can be prepared from one or more of mesitylene, xylene, toluene, benzene, naphthalene and the other aromatic hydrocarbon. Examples of the aromatic hydrocarbon-formaldehyde resins include mesitylene-formaldehyde resin, xylene-formaldehyde resin, toluene-formaldehyde resin, benzene-formaldehyde resin and naphthalene-formaldehyde resin.

Examples of the phenols include phenol, cresol, xylenol and resorcinol.

Examples of the formaldehydes include formaldehyde and compounds which generate formaldehyde under the reaction conditions.

The aromatic hydrocarbon-formaldehyde resin-modified novolaks may be obtained by reacting an aromatic hydrocarbon-formaldehyde resin with a phenol in the presence of an inorganic acid, such as sulfuric acid, hydrochloric acid or nitric acid; an acidic catalyst, such as toluene sulfonic acid, xylene sulfonic acid, or oxalic acid; or a neutral catalyst, such as calcium acetate, magnesium acetate, zinc acetate or the other organic metal salt, followed by reacting the reaction product with a formaldehyde. The aromatic hydrocarbon-formaldehyde resin-modified novolak may also be obtained by reacting a phenol with a formaldehyde, followed by reacting the reaction product with an aromatic hydrocarbon-formaldehyde resin. Alternatively, the novolak may be obtained by reacting an aromatic hydrocarbon-formaldehyde resin, a phenol and a formaldehyde at the same time. It is not preferable to use hexamethylene tetramine as a catalyst.

It is preferable that the aromatic hydrocarbon resin and the phenol be used in an approximately stoichiometric amount. That is, the aromatic hydrocarbon-formaldehyde resin and the phenol are preferably used in such proportions that the amount of phenol is approximately equal to the equivalent amount of a reactive group with phenol that is commonly used in the aromatic hydrocarbon-formaldehyde resin. Examples of the reactive groups include oxygen-containing groups, such as —$CH_2$—OH, —$CH_2$—O—$CH_2$—, —$CH_2$—O— and —$CH_2$—O—$CH_2$—OH. When the amount of a phenol is too small, some of the reaction product is gelled. As a result, the viscosity of the reaction mixture is increased, so the reaction is discontinued, unreacted materials remain in the reaction system. Conversely, if the amount of a phenol is too great, the friction coefficient of the resulting resin becomes unstable at a temperature of not less than 300° C.

The formaldehyde is used In a sufficient amount to cause a reaction for yielding a novolak.

For example, when xylene-formaldehyde resin (a number average molecular weight: of 350–800 and an oxygen content of 8–17% by weight) is reacted with a phenol, the ratio of the xylene-formaldehyde resin to the phenol may be in the range of 100:100 to 100:250 (by weight), and preferably 100:100 to 100:200. In this case, the resulting aromatic hydrocarbon-formaldehyde resin-modified novolak usually has a melting point of 60°–100° C. and is a brown solid.

Usually, an aromatic hydrocarbon-formaldehyde resin-modified novolak contains a phenol In an amount of about 5–6% by weight. The phenol-containing novolak can be used for preparing Component (I) of the present invention, as it is. If the content of the phenol is reduced to not more than 3% by weight, preferably not more than 1.5% by weight through reduced pressure treatment, the resulting novolak containing a phenol in an amount of not more than 3%, preferably not more than 3% by weight is preferable from a point of view of improvement in working environment and improvement in stability of the curing reaction of Components (I) and (II).

The phenolic hydroxy group of the aromatic hydrocarbon-formaldehyde resin-modified novolak is reacted with epichlorohydrin for epoxidation to form Component (I). The reaction is known. The resulting epoxy resin (Component (I)) usually has a melting point of not less than 45° C.

The cyanate ester resin composition (hereinunder referred to as Component (II)) contains (a) a polyfunctional cyanate ester, a prepolymer of said cyanate ester or a prepolymer of said cyanate ester and an amine or (a) and (b) a monofunctional or polyfunctional maleimide, prepolymer of said maleimide or prepolymer of said maleimide and an amine. In order to improve thermal resistance of the composition, (b) a monofunctional or polyfunctional maleimide, a prepolymer of the maleimide or a prepolymer of the maleimide and an amine (Component (b)) may be added to the Component (II).

In order to improve working properties, (c) epoxy resin may be added to the composition (II).

The cyanate ester resins (a) are known and are given in Japanese Patent Publication (Kokoku) Nos. 41-1928; 45-11712 and 44-1222; German Patent No. 1190184 and U.S. Pat. Nos. 4,026,913; 4,022,755; 3,448,079; 3,553,244; 3,755,402; 3,740,348; 3,595,900; 3,694,410 and 4,116,946 which are incorporated herein by reference.

The cyanate ester-maleimide resin ((a)+(b)) and the cyanate ester-maleimide-epoxy resin ((a)+(b)+(c)) are given in Japanese Patent Publication (Kokoku) Nos. 54-30440 and 52-31279 and U.S. Pat. No. 4,110,364. In addition, the cyanate ester-epoxy resin ((a)+(c)) is given in Patent Publication (Kokoku) No. 46-41112.

When maleimide Component (b) is used in the composition (II), the amount of the maleimide compound (b) employed may be not more than 80% by weight, and preferably 30–60% by weight. When the epoxy resin (c) is used, it is preferable to use the epoxy resin having functionalities of at least 3. The amount of the epoxy resin (c) employed is usually not more than 30% by weight and preferably 2–10% by weight. It is preferable to use the Component (a) in a major amount.

An inorganic filler with cleavage property (III) (hereinunder referred to as Component (III)) is used in the present second invention. Component (III) is effective in respect of the stability of the curing reaction and damping of a squeal of brakes.

Examples of Component (III) include mica, talc, wollastonite, graphite, h-BN (hexagonal boron nitride), in a flake-like powder or needle-like powder. The average particle size of Component (III) may be in the range of 0.1–300 μm. It is preferable to use an inorganic filler having average particle size of 1.0–200 μm in the present invention. Mica is preferable. Examples of micas include muscovite, phlogopite and biotite which are aluminum silicate-type natural minerals, fluorinated mica obtained by fluorinating each of these natural mica and synthetic mica.

It is preferable to use water-free mica in the invention. In particular, when a natural mica is used, it is preferable to dry the mica at a temperature of about 250° C. for one or more hours.

In the first invention, Component (II) may be in the range of not more than 50% by weight and preferably 10–40% by weight on the basis of the total amount of Components (I) and (II). The known catalyst for Components (I) or (II) may be added to the mixture of Components (I) and (II). Components (I) and (II) may be melt-blended and then they may be cured at a final curing temperature of not less than 200° C. so as to make the removal of reaction heat easier. The final curing temperature may be not more than 400° C., preferably in the range of 200°–350° C. under a nitrogen atmosphere, and may be not more than 270° C., preferably in the range of 200°–240° C. in air. The cured product is ground to obtain the resin dust.

In the second invention, the cyanate ester-based curable resin composition (II) may be in the range of not more than 50% by weight and preferably 10–40% by weight on the basis of the total amount of Components (I) and (II).

Component (III) may be used in an amount of 5–60 parts by weight, and preferably 8–40 parts by weight per 100 parts by weight the combined amount of Components (I) and (II). The known catalyst for Component (I) or (II) may be added to the mixture of Components (I), (II) and (III). Components (I) and (II) may be melt-blended and then they may be cured at a final curing temperature of not less than 200° C. under such conditions that the reaction heat is removed. The cured product is ground to obtain the resin dust.

In this case, Component (III) may be preliminarily mixed with Component (II) and then the mixture may be melt-blended with Component (I), and then the mixture may be cured. This method is preferable, since more uniform and more stable cured product can be obtained.

Optionally, the catalysts for Component (I) and the catalysts for Component (II) may be used. Examples of the catalysts for Component (I) include aliphatic or aromatic amines, imidazole, and phenol novolak resin. The catalysts for Component (II) include organic metal salts (including metal chelate compounds), inorganic metal salts and organic peroxides. These catalysts may be used alone or as a mixture. Examples of the organic metal salts include zinc naphthenate, lead stearate, lead naphthenate, zinc octoate, tin oleate, tin octoate, dibutyl tin maleate, manganese naphthenate, cobalt naphthenate, iron acetylacetonate and manganese acetylacetonate. Examples of the organic peroxides include benzoyl peroxide, lauroyl peroxide, capryl peroxide, acetyl peroxide, para-chloro benzoyl peroxide and di-tert.-butyl-di-perphthalate. Usually, a catalytic amount of the catalyst may be used. The amount of the catalyst may be in the range of 0.01–5% by weight on the basis of the weight of the total compositions.

This invention is further explained by way of the following non-limiting examples. All percentages and parts are on a weight basis, unless otherwise specified.

EXAMPLE

EXAMPLE 1

Xylene-formaldehyde resin (Mitsubishi Gas Chemical Co. Inc.(hereinunder referred to as MGC); Trade Name of Nikanol H; a number of average molecular weight of 460–500, and an oxygen content of 10–11%) (100 parts) was reacted phenol (120 parts) in the presence of para-toluene sulfonic acid (0.1 part) as a catalyst at 130° C. for 2 hours. Then zinc acetate dihydrate (1 part) and 37% formalin (40 parts) were added to the reaction mixture, and the reaction was carried out at 100° C. for 3 hours. Then, the mixture was dehydrated at a reduced pressure while heating. When the temperature raised to 150° C., dehydration was completed to obtain xylene-formaldehyde resin-modified novolak phenol resin having a melting point of 80° C.

The above xylene-formaldehyde resin-modified novolak phenol resin (100 parts), epichlorohydrin (170 parts) and water (170 parts) were blended with stirring to form the mixture. Solid sodium hydroxide (17 parts) was added to the resulting mixture while maintaining the mixture at a temperature of 80° C. with stirring. The reaction was carried out while blending uniformly. After the reaction was completed, the unreacted epichlorohydrin was removed at a reduced pressure. Benzene was added to the reaction system, and then pure water was added to the reaction system for washing. The water was removed. Again, pure water was added to the system for washing and then was removed. The addition of pure water and the removal of the water were repeated. The benzene was removed through vacuum distillation to obtain xylene-formaldehyde resin-modified novolak epoxy resin (hereinunder referred to as Resin I-1 having a melting point of 60° C.).

Resin I-1 (70 parts) and cyanate ester-maleimide resin (MGC, BT-2480) (30 parts) were melt-blended at 110° C. 2-Ethyl-4-methylimidazole (0.1 part) as a catalyst was added to the mixture, and the mixture was agitated at 150° C. For 30 minutes. The composition was cured at 150° C. for 30 minutes, 180° C. for 1 hour, 200° C. for 1 hour and 220° C. for 5 hours in the order of description.

The resulting cured product was cooled to room temperature and ground to obtain resin dust having 20–80 mesh (hereinunder referred to as Dust 1).

EXAMPLE 2

Naphthalene formaldehyde resin (100 parts) was reacted with phenol (100 parts) in the presence of paratoluene sulfonic acid (0.1 part) as a catalyst at 140° C. for 2 hours. Then oxalic acid (1 part) and 37% formalin (35 parts) were added to the reaction mixture, and the reaction was carried out at 100° C. for 2.5 hours. Then, the mixture was dehydrated at a reduced pressure while heating. When the temperature raised to 165° C., the dehydration was completed to obtain a naphthalene-formaldehyde resin-modified novolak phenol resin having a melting point of 130° C.

Naphthalene-formaldehyde resin-modified novolak epoxy resin (hereinunder referred to as Resin I-2) having a melting point of 105° C. was obtained from the naphthalene-formaldehyde resin-modified novolak phenol resin as in Example 1.

Resin I-2 (70 parts) and triazinemonomer (=2,2-bis (4-cyanatophenyl)propane) (30 parts) were melt-blended at 120° C. Zinc octoate (0.2 part) as a catalyst was added to the mixture, and the mixture was agitated at 150° C. for 30 minutes. The composition was cured at 150° C. for 30 minutes, 180° C. for 1 hour, 200° C. for 1 hour and 220° C. for 5 hours in the order of description.

The resulting cured product was cooled to room temperature and ground to obtain a resin dust having 20–80 mesh (hereinunder referred to as Dust 2).

EXAMPLE 3

The procedure of Example 1 was repeated except that xylene formaldehyde resin (MGC; Trade Name of Nikanol GP, having a melting point of 65°–70° C.) was used. Xylene-formaldehyde resin-modified novolak epoxy resin (hereinunder referred to as Resin I-3) having a melting point of 60° C. obtained.

Resin I-3 (70 parts) and cyanate ester-maleimide resin (MGC, BT-2600) (30 parts) were melt-blended at 2-Ethyl-4-methylimidazole (0.1 part) as a catalyst was added to the mixture, and the mixture was agitated at 150° C. for 30 minutes. The composition was cured at 150° C. for 30 minutes, 180° C. for 1 hour, 200° C. for 1 hour, and 230° C. for 5 hours in the order of description.

The resulting cured product was cooled to room temperature and ground to obtain a resin dust having 20–80 mesh (hereinunder referred to as Dust 3).

EXAMPLE 4

Cyanate ester-maleimide resin (MGC, BT-2480) (30 parts) was melted at 110° C. Synthetic mica (Corp Chemical, MK-100; average particle size of 4.7 μm) (20 parts) was added to the melted resin, and the mixture was melt-blended. Resin I-1 (70 parts) of Example 1 and 2-ethyl-4-methylimidazole (0.1 part) were added to the mixture. The mixture was blended with stirring at 150° C. for 30 minutes. The composition was cured at 150° C. For 30 minutes. 180° C. for 2 hours, 200° C. for 2 hours and 240° C. for 3 hours in the order of description.

The resulting cured product was cooled to room temperature and ground to obtain a resin dust having 20–100 mesh (hereinunder referred to as Dust 4).

EXAMPLE 5

Cyanate ester-maleimide resin (MGC, BT-2480) (30 parts) was melted at 110° C. Hexagonal boron nitride (h-BN particles) (Kawasaki Steel Co., Ltd., HP; average particle size of 5–15 μm) (20 parts) was added to the melted resin, and the mixture was melt-blended. Resin I-1 (70 parts) of Example 1 and 2-ethyl-4-methylimidazole (0.1 part) were added to the mixture. The mixture was blended with stirring at 150° C. For 30 minutes. The composition was cured at 150° C. for 30 minutes. 180° C. for 2 hours. 200° C. for 2 hours and 240° C. for 3 hours in the order of description.

The resulting cured product was cooled to room temperature and ground to obtain a resin dust having 20–100 mesh (hereinunder referred to as Dust 5).

Control Run 1

The procedure of Example 3 was repeated except cresol novolak type epoxy resin (DIC. N665) was used instead of Resin I-3. Resin dust (hereinunder referred to as Dust C1) having 20–80 mesh was obtained. Control Run 2

The procedure of Example 3 was repeated except that; bis-phenol A type epoxy resin (Shell, Epikote E-828) was used instead of Resin I-3. Resin dust (hereinunder referred to as Dust C2) having 20–80 mesh was obtained.

Application Example 1

Hexamine (12 parts) was added to phenol novolak and the mixture was ground and uniformly blended by ball mill to obtain a binder resin (hereinunder referred to as PN). Molding material having Dust 1 (10 parts). PN (15 parts), steel fibers (25 parts), rock wool (20 parts), aramide fibers (3 parts), barium sulfate (17 parts) and graphite (10 parts) was prepared. The molding material was compression-molded at 150° C. and 140 Kg/cm² for 10 minutes. Afterwards the molded product was withdrawn from the mold, and was after-cured in an oven at 200° C. for 8 hours to obtain molded product for friction material.

Application Example 2

Iron acetyl acetonate (0.2 parts) and dicumyl peroxide (0.3 parts) as a catalyst were added to cyanate ester-maleimide resin (MGC, BT-2480, powder having mesh size of 100 pass) (100 parts). The mixture was uniformly blended by Henshel mixer to a binder resin (hereinunder referred to as BT-248). Molding material having Dust 2 (10 parts), BT-248 (15 parts), glass fibers (20 parts), rock wood (20 parts) brass fibers (8 parts), aramide fibers (2 parts), barium sulfate (20 parts) and graphite (5 parts) was prepared. The molding material was compression-molded at 180° C. and 140 Kg/cm² for 10 minutes. Afterwards the molded product was withdrawn from the mold, and was after-cured in an oven of 230° C. for 8 hours to obtain molded product for friction material.

Application Example 3

Iron acetyl acetonate (0.2 parts) and dicumyl peroxide (0.5 parts) as a catalyst were added to cyanate ester-maleimide resin (MGC, BT-4480, powder having mesh size of 100 pass) (100 parts). The mixture was uniformly blended by Henshel mixer to binder resin (hereinunder referred to as BT-448). Molding material having Dust 3 (10 parts), BT-448 (15 parts), brass fibers (15 parts), ceramic fiber (15 parts), aramide fibers (10 parts), barium sulfate (25 parts) and graphite (10 parts) was prepared. The molding material was compression-molded at 175° C. and 140 Kg/cm² for 10 minutes. Afterwards the molded product was withdrawn from the mold, and was after-cured in an oven of 230° C. for 8 hours to obtain molded product for friction material.

Application Example 4

The procedure of Application Example 1 was repeated except that Dust 4 was used instead of Dust 1 to prepare the molding material. The molding material was compression-molded at 150° C. and 250 Kg/cm² for 10 minutes. Afterwards the molded product was withdrawn from the mold, and was after-cured in an oven at 200° C. for 8 hours to obtain a molded product for friction material.

Application Example 5

The procedure of Application Example 2 was repeated except that Dust 5 was used instead of Dust 2 to prepare the molding material. The molding material was compression-molded at 180° C. and 400 Kg/cm² for 10 minutes. Afterwards the molded product was withdrawn from the mold, and was after-cured in an oven at 230° C. for 8 hours to obtain a molded product for friction material.

Application Control Runs 1 and 2

The procedure of Application Example 1 were repeated except that Dust C1 (Control Run 1) and Dust C2 (Control Run 2) were used instead of Dust 1 to obtain molded products for friction material.

Application Control Runs 3-5

The procedure of each of Application Examples 1-3 was repeated except that cashew dust was used instead of each of Dusts 1-3 to obtain molded products for friction material.

Acetone-soluble matter and heating weight loss temperature of each of dusts obtained in Examples 1-5, Control Runs 1-2 and cashew dust were measured. The results are shown in Tables 1 and 2.

Measuring Conditions

Dried powder (about 10 g) was extracted with acetone. The dried powder was weighed before and after the extraction.

TABLE 1

| | Acetone-soluble matter | | | | | |
|---|---|---|---|---|---|---|
| | Ex. 1 | Ex. 2 | Ex. 3 | Ex. 4 | Ex. 5 | cashew dust |
| acetone extraction ratio (%) | 0.2 | 0.6 | 0.1 | 0.1 | 0.1 | 7.5 |

TABLE 2

| | Weight loss temperature on heating | | | | | | | |
|---|---|---|---|---|---|---|---|---|
| | Ex. 1 | Ex. 2 | Ex. 3 | Ex. 4 | Ex. 5 | Cont. Run 1 | Cont. Run 2 | cashew dust |
| 10% weight loss | 370 | 365 | 410 | 382 | 381 | 342 | 315 | 290 |
| 50% weight loss | 510 | 495 | 533 | 573 | 570 | 499 | 454 | 405 |
| 90% weight loss | 685 | 670 | 690 | 743 | 748 | 620 | 535 | 590 |

Measuring Conditions: room temperature to 800° C.
Rising speed of temperature: 10° C./min.
Sample amount: about 15 mg The friction coefficient of each of the molded products obtained in Application Examples 1-5 and Application Control Runs 1-5 was measured. The results are shown in Table 3.

TABLE 3

| | | Friction coefficient | | | | | | | |
|---|---|---|---|---|---|---|---|---|---|
| | Dust | 25° C. | 100° C. | 150° C. | 200° C. | 250° C. | 300° C. | 350° C. | 400° C. |
| Appln. Ex. 1 | 1 | 0.48 | 0.46 | 0.44 | 0.46 | 0.44 | 0.44 | 0.45 | 0.43 |
| Appln. Ex. 2 | 2 | 0.46 | 0.45 | 0.45 | 0.44 | 0.42 | 0.41 | 0.41 | 0.40 |
| Appln. Ex. 3 | 3 | 0.58 | 0.54 | 0.54 | 0.54 | 0.51 | 0.50 | 0.49 | 0.50 |
| Appln. Ex. 4 | 4 | 0.47 | 0.46 | 0.45 | 0.45 | 0.44 | 0.43 | 0.43 | 0.42 |
| Appln. Ex. 5 | 5 | 0.48 | 0.46 | 0.43 | 0.43 | 0.42 | 0.41 | 0.41 | 0.40 |
| Appln. Cont. Run 1 | C1 | 0.37 | 0.39 | 0.39 | 0.41 | 0.46 | 0.39 | 0.32 | 0.21 |
| Appln. Cont. Run 2 | C2 | 0.38 | 0.38 | 0.40 | 0.34* | 0.51 | 0.39 | 0.24 | 0.18 |
| Appln. Cont. Run 3 | cashew dust | 0.47 | 0.45 | 0.41 | 0.38 | 0.31 | 0.28 | 0.21 | 0.16 |
| Appln. Cont. Run 4 | cashew dust | 0.45 | 0.44 | 0.45 | 0.43 | 0.40 | 0.36 | 0.29 | 0.27 |
| Appln. Cont. Run 5 | cashew dust | 0.51 | 0.48 | 0.47 | 0.47 | 0.43 | 0.37 | 0.33 | 0.30 |

Note:
*Friction coefficient was instable, and tackiness was also caused.

The dust for friction material is used in order to improve the friction coefficient of the friction material low temperatures ranging from ordinary temperature to about 150° C. During application of the brake such as hard braking, the dust for friction material becomes as hot as 250°–400° C. thus wearing away or undergoing decomposition.

Therefore, the effort to improve the heat resistance of the dust for friction material does not only increase the friction coefficient of the friction material at low temperature in the range of from room temperature to about 150° C. In addition, it is necessary that the dust for friction material does neither cause melting nor liquidifying and does not become tacky at 200°–300° C. and does not rapidly cause decomposition-gasifying at elevated temperatures exceeding 300° C. When melting, liquidifying or tackifying is caused, abnormal vibrations are caused, whereby driving operation becomes difficult. When decomposition-gasifying is caused, the substantial loss of braking power called "fade" occurs suddenly. This is potentially very dangerous since it will lead to an accident.

It is clear from Table 3 that the friction materials obtained by using the dusts of the present invention exhibit a friction coefficient equivalent to the friction material obtained by using the cashew dust in the range of room temperature to 150° C., and the friction coefficient of the friction material obtained by using the dust of the present invention at 400° C. is approximately equivalent to that at 150° C. On the other hand, the friction coefficient of the friction material obtained by using cashew dust is reduced from 250°–300° C.

When conventional epoxy resin was used instead of the aromatic hydrocarbon resin-modified novolak epoxy resin of the present invention (Application Control Runs 1 and 2), the friction coefficient of the resulting friction material obtained by using the conventional epoxy resin is low, in the range of room temperature to 150° C., and the friction coefficient in the range of 200°–300° C. becomes unstable, and tackiness is caused. The friction coefficients of the friction materials of Application Control Runs 1 and 2 are reduced to a considerable extent; in the temperature range of more than 200°–300° C. for liquefication of the friction materials.

It is apparent from Tables 2 and 3 that the friction material obtained by using the dust of the present invention exhibit sufficiently high friction coefficient in the range of about 450°–500° C.

Effectiveness of the Present Invention

As is apparent from the above description, the friction material obtained by using the thermal resistance resin dust of the present invention has a high friction coefficient in the range of room temperature to 400°–500° C., and the present invention is significant from an industrial view point.

What is claimed is:

1. A thermal resistance resin dust for friction material obtained by a process which comprises
   a step of preparing a composition consisting essentially of
   (I) 60–90% by weight of an aromatic hydrocarbon-formaldehyde resin modified novolak type epoxy resin and
   (II) 40–10% by weight of a cyanate ester resin composition comprising (a) polyfunctional cyanate esters, prepolymers of said cyanate ester, or prepolymers of said cyanate ester and an amine; or (a) in combination with (b) a monofunctional or polyfunctional maleimide, a prepolymer of said maleimide or a prepolymer of said maleimide and an amine,
   a step of curing the composition at a final curing temperature of not less than 200° C. and
   a step of grinding the cured product.

2. The resin dust of claim 1 wherein said aromatic hydrocarbon-formaldehyde resin-modified novolak type epoxy resin (I) is obtained by reacting an aromatic hydrocarbon-formaldehyde resin, a phenol and a formaldehyde to form an aromatic hydrocarbon-formaldehyde resin-modified novolak, followed by reacting the OH group of the resulting novolak with epichlorohydrin to epoxidize the novolak.

3. The resin dust of claim 2 wherein said aromatic hydrocarbon-formaldehyde resin has a number average molecular weight of 350–1000, an oxygen content of 5–20% and a melting point of 40°–120° C.

4. The resin dust of claim 3 wherein said aromatic hydrocarbon-formaldehyde resin is at least one selected from the group consisting of mesitylene-formaldehyde resin, xylene-formaldehyde resin, toluene-formaldehyde resin, benzene-formaldehyde resin and naphthalene-formaldehyde resin.

5. The resin dust of claim 2 wherein said aromatic hydrocarbon-formaldehyde resin-modified novolak is prepared by using an aromatic hydrocarbon-formaldehyde resin/phenol having a ratio by weight of 100:100 to 100:200.

6. A thermal resistance resin dust obtained by a process which comprises
   a step of preparing a composition consisting essentially of
   (I) 69–90% by weight of an aromatic hydrocarbon-formaldehyde resin-modified novolak type epoxy resin,
   (II) 40–10% by weight of a cyanate ester resin composition comprising (a) polyfunctional cyanate esters, prepolymers of said cyanate ester, or prepolymers of said cyanate ester and an amine; or (a) in combination with (b) a monofunctional or polyfunctional maleimide, a prepolymer of said maleimide or a prepolymer of said maleimide and an amine, and
   (III) an inorganic filler with cleavage property, Component (III) being used in an amount of 5–60 parts by weight per 100 parts by weight of the combined amount of components of (I) and (II),
   a step of curing the composition at a final curing temperature of not less than 200° C. and
   a step of grinding the cured product.

7. The resin dust of claim 6 wherein said aromatic hydrocarbon-formaldehyde resin-modified novolak type epoxy resin is obtained by reacting an aromatic hydrocarbon-formaldehyde resin, a phenol and a formaldehyde to form an aromatic hydrocarbon-formaldehyde resin-modified novolak, followed by reacting the OH group of the resulting novolak with epichlorohydrin to epoxidize the novolak.

8. The resin dust of claim 7 wherein said aromatic hydrocarbon-formaldehyde resin has a number average molecular weight of 350–1000, an oxygen content of 5–20% and a melting point of 40°–120° C.

9. The resin dust of claim 8 wherein said aromatic hydrocarbon-formaldehyde resin is at least one selected from the group consisting of mesitylene resin, xylene resin, toluene resin, benzene resin and naphthalene resin.

10. The resin dust of claim 7 wherein said aromatic hydrocarbon-formaldehyde resin-modified novolak is prepared by using an aromatic hydrocarbon-formaldehyde resin/phenol having a ratio by weight of 100:100 to 100:200.

11. The resin dust of claim 6 wherein the amount of said inorganic filler (III) with cleavage property employed is in the range of 8–40 parts by weight per 100 parts by weight of the combined amount of (I) and (II).

12. The resin dust of claim 6 wherein said inorganic filler (III) is selected from mica or hexagonal boron nitride.

13. The resin dust of claim 6 wherein said inorganic filler (III) is used as a mixture of said inorganic filler (III) and Component (II).

14. A thermal resistance resin dust for use in the manufacture of friction materials, said resin dust consisting essentially of a cured and ground mixture of (I) an aromatic hydrocarbon-formaldehyde resin-modified novolak type epoxy resin, (II) a cyanate ester resin, and optionally (III) an inorganic filler having a cleavage property, said cured and ground mixture having a 10% maximum weight loss on heating to a temperature of not less than 320° C. and a property of thermally decomposing without undergoing liquification.

15. A thermal resistance resin dust in accordance with claim 14 wherein said cyanate ester resin is present in an amount of 40 to 10% based on the total weight of said mixture, and said aromatic hydrocarbon-formaldehyde resin-modified novolak type epoxy resin is a reaction product of (1) epichlorohydrin with (2) an aromatic hydrocarbon resin-modified novolak reaction product of (2i) an aromatic hydrocarbon-formaldehyde resin having a reactive OH on its aromatic ring, (2ii) formaldehyde, and (2iii) a phenol.

16. A composition according to claim 15 wherein said inorganic filler is present in an amount of 5–60 parts by weight per 100 parts by weight based on the total amount of said aromatic hydrocarbon-formaldehyde resin-modified novolak type epoxy resin and said cyanate ester resin.

* * * * *